(12) United States Patent
Connors et al.

(10) Patent No.: US 8,386,284 B2
(45) Date of Patent: Feb. 26, 2013

(54) DEMAND MODELING IN RETAIL CATEGORIES USING RETAIL SALES DATA SETS WITH MISSING DATA ELEMENTS

(75) Inventors: Daniel P. Connors, Pleasant Valley, NY (US); Lin Li, Colleyville, TX (US); Ramesh Natarajan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/115,723

(22) Filed: May 25, 2011

(65) Prior Publication Data

US 2012/0303410 A1    Nov. 29, 2012

(51) Int. Cl.
*G06Q 40/00*    (2006.01)
(52) U.S. Cl. ...................................... 705/7.11; 705/7.42

(58) Field of Classification Search ......... 705/7.11–7.42
See application file for complete search history.

(56) References Cited

U.S. PATENT DOCUMENTS

| | | | | |
|---|---|---|---|---|
| 6,032,123 | A * | 2/2000 | Jameson | 705/7.22 |
| 6,988,076 | B2 * | 1/2006 | Ouimet | 705/7.36 |
| 7,912,748 | B1 * | 3/2011 | Rosenberg et al. | 705/7.35 |
| 2005/0197896 | A1 * | 9/2005 | Veit et al. | 705/14 |
| 2005/0197897 | A1 * | 9/2005 | Veit et al. | 705/14 |
| 2006/0161504 | A1 * | 7/2006 | Walser et al. | 705/400 |
| 2010/0318403 | A1 * | 12/2010 | Bottom | 705/10 |

* cited by examiner

*Primary Examiner* — Thomas Dixon
*Assistant Examiner* — Benjamin S Fields
(74) *Attorney, Agent, or Firm* — Scully, Scott, Murphy & Presser, P.C.; Daniel P. Morris, Esq.

(57) ABSTRACT

A system, method and computer program product provides for accurate demand modeling and forecasting in retail categories using retail sales data sets with missing data values, in order to enable a variety of retail decision-support applications.

22 Claims, 8 Drawing Sheets

| 40 | | | | |
|---|---|---|---|---|
| STORE ID | PRODUCT ID | WEEK ID | UNIT SALES | UNIT PRICE |
| XXXXXX | 111111111 | 20060819 | 14 | $1.69 |
| YYYYYY | 222222222 | 20060819 | 20 | $2.69 |
| ZZZZZZ | 333333333 | 20060826 | 44 | $1.50 |
| ZZZZZZ | 111111111 | 20060812 | - | - |

EXAMPLE OF SALES DATA

| 50 | | | | | | |
|---|---|---|---|---|---|---|
| STORE ID | UPC | WEEK | UNIT SALES | UNIT PRICE | TYPE I MISSIING | TYPE II MISSIING |
| XXXXXX | 111111111 | 20060812 | - | - | 1 | 0 |
| YYYYYY | 111111111 | 20060826 | - | - | 0 | 1 |
| ZZZZZZ | 333333333 | 20060826 | 44 | $1.50 | 0 | 0 |

EXAMPLE OF SALES DATA WITH DUMMY VARIABLES FOR MISSING DATA

| UPC | WEEK | price_store1 | price_store2 | price_store3 | price_store4 |
|---|---|---|---|---|---|
| 111111111 | 20060812 | $2.92 | - | $2.39 | $2.43 |
| 111111111 | 20060826 | $2.79 | $2.67 | $2.44 | $2.79 |
| 333333333 | 20060826 | $1.52 | $1.59 | - | $1.57 |

| STORE ID | WEEK | price_upc1 | price_upc2 | price_upc3 | price_upc4 | price_upc5 |
|---|---|---|---|---|---|---|
| XXXXXX | 20060812 | $2.75 | - | $2.24 | - | $4.57 |
| YYYYYY | 20060826 | - | $1.50 | $2.74 | - | $4.00 |
| ZZZZZZ | 20060826 | $3.67 | $1.90 | $2.17 | $3.15 | - |

FIG. 8

DEMAND MODELING IN RETAIL CATEGORIES USING RETAIL SALES DATA SETS WITH MISSING DATA ELEMENTS

BACKGROUND

The present invention generally relates to methods for demand modeling in retail categories, e.g., for use in a retail decision-support applications; and, more particularly, the present invention relates to a method for demand modeling in retail categories using retail sales data sets with missing data elements.

The demand models required for decision-support applications widely used by various entities in the retail supply chain such as, for example, consumer product manufacturers, consumer retail chains, and individual retail stores, are typically obtained by fitting regression models to the historic sales data for the relevant products in the retail category. Subsequently, depending on the application, these fitted regression models are used to obtain predictions for the demand and/or the price sensitivity of demand for the relevant products in the retail category, based on the various marketing actions and market conditions.

In a current embodiment of demand modeling, the retail sales data sets that are required for the regression analysis are typically obtained in the form of time-series sequences of unit-prices and corresponding unit-sales for the relevant products in the specified retail category of interest, over a collection of stores in the particular market geography of interest. The typical time period for the sales reporting in these retail data sets is weekly, and the sequence of time series values can range over a period of several months to years.

In essence, therefore, these sales data sets are typically comprised of individual data records containing the unit-price and corresponding unit-sales values for a set of relevant products (whose elements are indexed by "p"), a set of relevant stores (whose elements are indexed by "s"), and the set of consecutive time-periods (whose elements are indexed by "t"). Parenthetically, it is noted that the unit-price field may not be explicitly specified in the sales data sets, but its value can always be readily ascertained, for example, from the total-revenue and unit-sales fields for each (p, s, t) combination.

Suitable sales data sets for the demand modeling analysis, of the form described above, may be obtained from a variety of sources, including, for example, retail point-of-sales systems, vendor-managed inventory and billing systems, and databases of commercial aggregators of retail data such as Nielsen (http://en-us.nielsen.com) and SymphonyIRI (http://www.symphonyiri.com).

Furthermore, whenever possible, these sales data sets can also be augmented with other data sources containing information of brand advertising, promotional data, shelf and display data, and product stock and inventory positions, which will improve the accuracy and interpretability of the resulting demand models. However, the use of these additional data sources has often been limited, primarily due to the difficulty of acquiring this data, which even when acquired is often incomplete and may contain missing data elements, which in turn leads to difficulties in using the usual methods for demand modeling analysis in the prior art that invariably require complete data sets with no missing data elements.

The use of multi-product and multi-store data, as described above, can be of considerable value for demand modeling in a retail category. For instance, in many applications, the specific focus of the demand-modeling analysis is on a single product or on a small set of target products of interest, but nevertheless, it is always advantageous to jointly model the demand for these products in the context of a larger subset of products, even perhaps the entire retail category that contains this product subset, in order to ensure that any relevant cross-elasticity effects due to product substitution or product "drag" are properly incorporated in the demand modeling analysis. Product substitution refers to the substitution of a promoted product for a competitor product to which it is equivalent in consumer functionality which leads to a cannibalization of the competitor product sales, and product drag refers to the ability of a promoted product to increase the sales of the associated non-substitutable products that tend to be jointly purchased with the promoted product. Similarly, in many applications, the specific focus of the demand-modeling analysis is often on a single store of interest, but nevertheless, it is always advantageous to examine the sales data across multiple stores that stock the same product set for the retail category, so that for instance, the data may be pooled across the stores to reduce the estimation errors for the parameters in the demand model.

Alternatively, rather than pooling, the store-level data may used to identify important store-level effects on the demand models, as described in the prior art by P. Chintagunta, J. P. Dube and V. Singh, "Market structure across stores: An application of a random coefficients logit model with store level data," in Advances in Econometrics, eds. P. H. Franses and A. Montgomery, Amsterdam N.Y., JAI Press, 2002.

It would be highly desirable to provide multi-product, multi-store and multi-time period data sets for demand modeling, that addresses a pervasive limitation that arises, in this regard, due to the invariable presence of missing data records and missing data elements in the relevant sales data sets for specific combinations of product "p", store "s" and time-period "t".

There is now considered some of the limitations of the prior art for the specification and imputation of the missing data elements.

For instance, one approach that is widely used in the prior art for missing data elements in demand modeling analysis, is to simply exclude the entire set of related data records for all products in the modeling choice set for any (s, t) combinations for which there is even a single product that has missing data elements; this is the so-called "record deletion" approach (which is also often termed the "complete case" approach), and is necessary in this context since, by default, the methods in the prior art for demand modeling analysis cannot use any sales data records for which even one of the products in the choice set with the same (s, t) combination have missing target values (or in this case, equivalently, missing unit sales values). That is, the demand modeling analysis must exclude the data records for all products for a particular (s, t) combination, if even a single product in this choice set has a missing data record for that (s, t) combination. It can be readily seen that this "record deletion" approach will significantly reduce the size of the data set, and lead to a large number of data records with valid and non-missing values in the sales data set also being excluded from the demand modeling analysis, in addition to the typically smaller fraction of data elements that actually have missing values.

An alternative approach to "record deletion" that is also widely used in the prior art, which does not require having to discard the entire set of valid data elements for an (s, t) combination for which even a single product in the choice set has missing data, is termed "complete case" analysis, which is based on examining the pattern of the missing data elements in the sales data set, in order to obtain probabilistic estimates for the missing data elements, and in this way to "complete" the data set for the demand modeling analysis. For example, a sequence of missing values in the time series for a given (p, s) combination, at either the beginning or end of the time series data set, strongly suggests that these missing values have root cause which can be attributed to the late introduction or early withdrawal of the product in the specific store; therefore, this clearly corresponds to a root cause for which the corresponding unit-sales can be unambiguously specified to be zero.

Alternatively, in situations where there are actual non-zero unit sales for a particular (p, s, t) combination, but nevertheless, the relevant data record was omitted from the data set, the missing unit-sales and unit-price values for the data element corresponding to a certain (p, s, t) combination can be imputed by replacing it by the mean (that is, the average) of the corresponding values of unit-sales and unit-price over the other stores in the same retail chain for the same (p, t) combination. The approach of imputing any missing values by their corresponding mean value over the remaining non-missing data values has the disadvantage that it deflates the variance of the unit-sales and unit-price variation, distorts the cross-product and cross-time correlations in the unit-prices and unit-sales data, and biases the relationship between the unit-price and unit-sales in the "complete" data set that contains these mean-imputed values.

In view of this it would be highly desirable to provide an improved system and method for specifying or imputing missing data elements in the retail-sales data sets used for demand modeling.

There are many developments in the prior art for imputing missing-value in data sets that are used for statistical analysis, wherein in general terms, the relevant methods are based on classifying the mechanism that is responsible for the pattern of missing values in the data sets, as described by R. Little and D. Rubin, "Statistical Analysis with Missing Data," $2^{nd}$ Edition, Wiley and Sons, 2002; J. L. Schafer and J. W. Graham, "Missing Data: Our View of the State of the Art", Psychological Methods, Vol. 7, No. 2, pages 147-177 (2002). For instance, the missing value patterns could be termed "Missing Completely At Random" (or MCAR) if it is assumed that the probability of a given record having missing values is that same for all records (that is, the pattern of missing values is completely independent of the remaining variables and factors in the data set, and as a result, excluding the data records with these missing data elements from the data set, as in the "record deletion" approach does not lead to any statistical bias from using this selection mechanism for the retained data records for the demand modeling analysis). Although the MCAR assumption may be tenable for certain root cause in retail sales data sets, it can be readily discerned that in most cases, the pattern of missing value depends on other observed factors within the data set, and the resulting missing value patterns are termed "Missing At Random" (or MAR). If either the MCAR or MAR assumptions are invalid, then the alternative, wherein the pattern of missing values may depend on unobserved factors, or even on the magnitude of the missing value itself, would be termed "Missing Not At Random" (or MNAR); this alternative is difficult to analyze and requires explicit modeling of the missing data mechanism.

A major methodological development in the prior art for missing data in statistical data sets is the use of multiple imputation, wherein multiple complete data sets are obtained, and wherein the missing values in the original data set take on a range of imputed values across these multiple complete data sets. Unlike the single imputation case in which there is only a single complete data set, the use of multiple imputation allows the randomness and variability of the missing data estimate to be captured for any subsequent statistical analysis; this statistical analysis can be carried out separately for each of the multiple complete data sets in the conventional way, and the results from these separate analyses can be suitably combined, and in this way to obtain more robust estimates for the model parameters and their standard errors than would be possible from a single complete data set. A description of multiple imputation may be found in D. B. Rubin. "Multiple imputation after 18+ years (with discussion)." *Journal of the American Statistical Association*, Vol. 91, pages 473-489, 1996. An important aspect of the methodology described in Rubin is that the number of the multiple complete data sets can be small, and typically between 3 to 5 complete data sets are sufficient for the subsequent statistical modeling.

It would thus be desirable to provide a system and method implementing machine-executable steps that address the missing values in the sales data sets, and that addresses several specific concerns and characteristics of the retail demand modeling application.

For example, one approach for handling missing values in the data sets for demand modeling analysis that is consistent with the prior art, is to use a standard off-the-shelf multiple imputation technique before carrying out the demand modeling analysis. For example, the "chained equation" approach described in T. E. Raghunathan, J. M. Lepkowski, J. Van Howeyk and P. Solenberger, "A Multivariate Technique for Multiply Imputing Missing Values Using a Sequence of Regression Models", Survey Methodology, Vol. 27, No. 1, pages 85-95, 2001 is an advanced multiple imputation technique in the prior art for the MAR case, wherein a multivariate model is assumed for all the variables in the data set, and in particular, those variables with missing data fields are assumed to have some conditional distributional based on the other variables in the data. Since this dependency assumption can lead to cyclic dependencies between variables having missing values, the imputation procedure can sequentially iterate to compute the required missing values consistent with this assumed multivariate form. There are two difficulties with this approach: The first difficulty is that the form of conditional dependency between the unit-sales and the unit-price variables in the missing data imputation may be inconsistent with the form that is used in the subsequent demand modeling analysis, which may involve a more detailed set of factors and a more complex model function dependency between the response unit-sales variables and the covariate unit-price variables. The second difficulty is that the inclusion of the detailed and complex demand response relationship in the multiple imputation, makes it impossible to use existing "off-the-shelf" multiple imputation software (Y. C. Yuan, Multiple Imputation for Missing Data: Concepts and New Developments, Abstract P267-25, Proceedings of the Annual SAS Users Group International Conference 2000) which often only support very simple multivariate dependence models.

Even when more complex dependencies are supported, the resulting increase in the computational cost of the method steps makes the chained equation approach all but impractical for large and high-dimensional data sets found in retail applications.

It would be further desirable to decouple the imputation steps for the missing unit-price and the missing unit-sales values in the sales data set, which is specifically applicable for the missing data elements wherein both these fields are missing in the same data record corresponding to a specific (s, t) combination.

SUMMARY

In one aspect, there is provided a system, methods and computer program product for demand modeling in retail categories.

In one embodiment, a computer-implemented method for accurate demand modeling in a retail category comprises:
selecting a product set for a demand modeling analysis in a chosen retail category;
obtaining a retail-level sales data set for the product set in the chosen retail category having data elements representing a time series of unit-prices and unit-sales for the plurality of products "p" in a chosen retail category taken over a plurality of time periods "t", and over a plurality of retail chains and stores "s", the sales data set having a combination of data elements (p, s, t);
identifying any missing data element corresponding to a specific (p, s, t) combination in the retail sales data set and determining a root cause type for each the missing data element;
encoding dummy variables for the missing data elements in the retail sales data set, wherein for any missing elements corresponding to specific (p, s, t) combinations in the data set, the dummy variable value encoding performed according to the corresponding root cause for the missing data element; and,
generating a demand model for the products in the retail category from the sales data set containing the missing data elements corresponding to the root causes for certain product, store and time-period combinations, wherein a computing system including at least one processor and at least one memory device connected to the processor performs the selecting, obtaining, identifying, encoding and the generating.

Further to this aspect, a corresponding root cause type for said missing data element comprises: a first type root cause for a missing data element due to a unit-sales being zero, and a second type root cause for the missing data element that does not have a first type root cause, but for which the corresponding data element would have had a non-zero unit-sales value that is omitted from the sales data set.

Moreover, the method further comprises: augmenting the sales data set in the chosen retail category with auxiliary data comprising: individual product attributes, individual store attributes and other econometric factors that influence customer demand in the retail category.

Further to this aspect, the encoding of dummy variables for the missing data elements corresponding to the first type root cause comprises:
specifying the unit-sales values for a first type root cause and setting the unit-sales values to zero for the relevant missing data elements for the product, store, time-period combination; and
specifying the unit-price values for a first type root cause and setting the unit-price values to a fictitious value significantly greater than the actual unit price for the corresponding product, store and time-period combination, and greater than the actual unit prices for any of the other products in the selected product set for the same store, time-period combination.

Moreover, further to this aspect, the encoding of dummy variables for the missing data elements corresponding to the second type root cause further comprises:
imputing the unit-price values for the missing data elements for each combination of (p, s, t) with the second type root cause, and replacing each missing unit-price value by a single imputed value, said method further comprising:
initializing the missing unit-sales values corresponding to the imputed unit-price values by an initial estimate value, thereby obtaining a single complete data set for said demand modeling.

Moreover, for a case of multiple imputation, the imputing the unit-price values for the missing data elements for each combination of (p, s, t) with the second type root cause, includes:
replacing each missing unit-price value by a plurality of imputed price values; and,
initializing any missing unit-sales values corresponding to the plurality of imputed unit-price values by an initial estimate value, thereby obtaining a plurality of complete data sets for the demand modeling.

In one aspect, the computer-implemented method further comprises: estimating parameters of a demand response model associated with a respective single complete data set or, a respective complete set of the plurality of complete data sets. Then, for each demand model, starting from the initial estimate value for the second type root cause missing unit-sales values, an iterative-convergent procedure is used to revise estimates of the unit-sales values for the second type root cause missing data elements based on predictions obtained from the demand model, and replace, at each iteration, existing estimate values for the second type root cause missing unit-sales values with revised estimate values using the demand model predictions. The modeling and predicting is repeated until a sequence of demand models from these iterations converges to a final demand model within a predetermined numerical tolerance.

Further, the modeling and predicting is repeated until a sequence of data sets with the missing unit-sales values re-estimated converges to a final value within a predetermined tolerance, whereby one or more single self-consistent converged demand model and one or more corresponding converged imputed data sets is obtained.

With respect to a further embodiment, a system is provided for accurate demand modeling in a retail category that comprises:
at least one processor; and
at least one memory device connected to the processor, wherein the processor is programmed to:
select a product set for a demand modeling analysis in a chosen retail category;
obtain a retail-level sales data set for the product set in the chosen retail category having data elements representing a time series of unit-prices and unit-sales for the plurality of products "p" in a chosen retail category taken over a plurality of time periods "t", and over a plurality of retail chains and stores "s", the sales data set having a combination of data elements (p, s, t);
identify any missing data element corresponding to a specific (p, s, t) combination in the retail sales data set and determining a root cause type for each the missing data element;
encode dummy variables for the missing data elements in the retail sales data set, wherein for any missing elements corresponding to specific (p, s, t) combinations in the data set, the dummy variable value encoding performed according to the corresponding root cause for the missing data element; and,
generate a demand model for the products in the retail category from the sales data set containing the missing data elements corresponding to the root causes for certain product, store and time-period combinations.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the accompanying description, serve to explain the principles of the invention. In the drawings.

FIG. 2 illustrates the structure and contents of an example primary sales data set schematically before and after using dummy variables for the rows with missing values.

FIG. 7 illustrates computer-implemented method for the data schematically that is required for the imputation of the unit-price fields for type II missing data records using the cross-product correlations of the unit price for a specific store;

FIG. 8 illustrates the structure and contents of the data schematically that is required for the imputation of the unit-price fields for type II missing data elements using cross-store correlations of the unit price for a specific product;

DETAILED DESCRIPTION

A system, method and computer program product provides for accurate demand modeling and forecasting in retail categories using retail sales data sets with missing data values, in order to enable a variety of retail decision-support applications.

In one aspect, the present disclosure addresses methods for demand modeling in retail categories, which is an important methodological requirement for a variety of decision-support applications that are widely used by various entities in the retail supply chain such as consumer product manufacturers, consumer retail chains, and individual retail stores. Some examples of decision-support applications that require demand modeling in retail categories include, but are not limited to: product demand forecasting, inventory optimization, strategic product pricing, product-line rationalization, and promotion planning.

Figure 1:
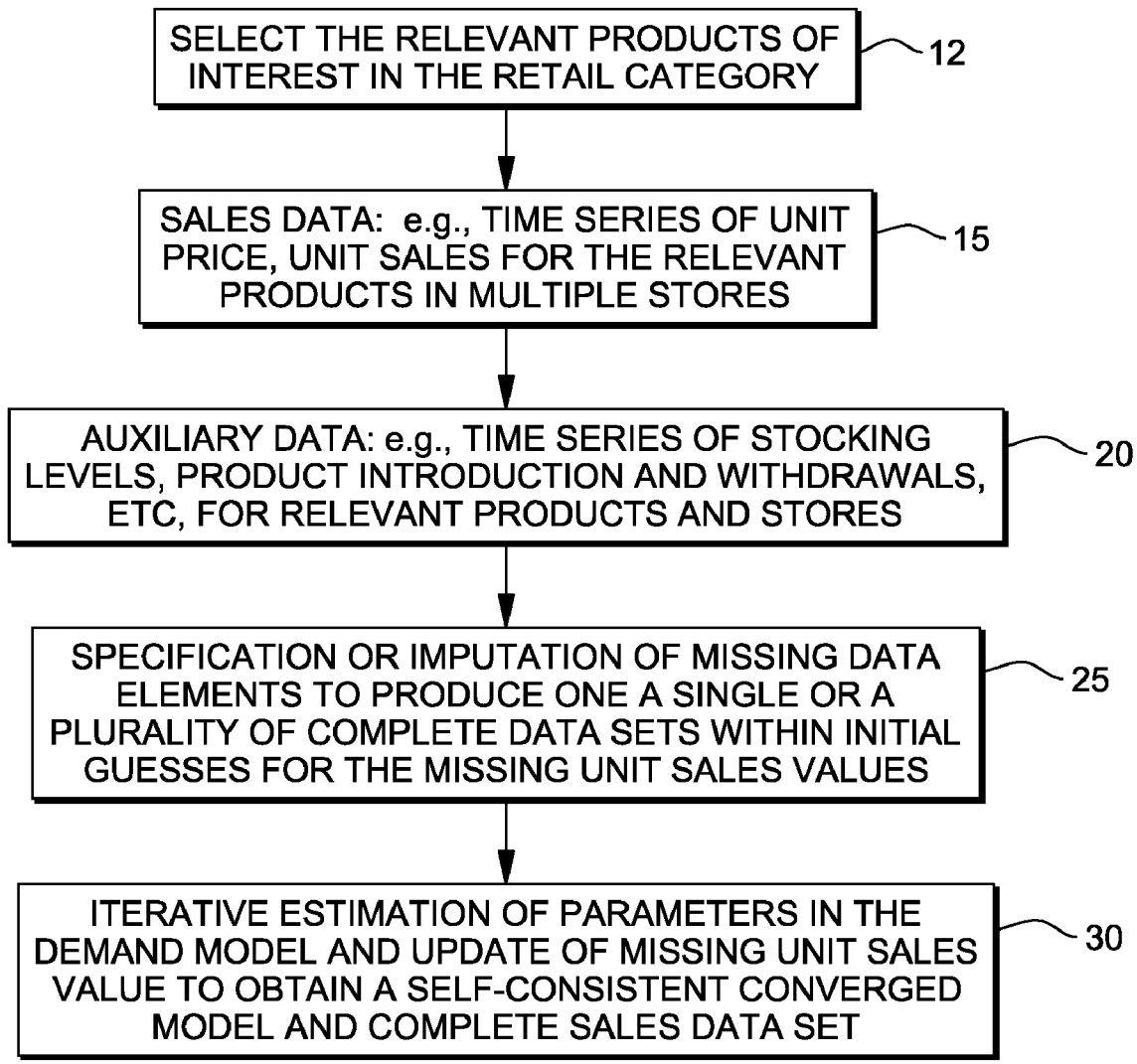
FIG. 1 illustrates the computer-implemented method for accurate demand modeling and forecasting in retail categories using retail sales data sets with missing data values, in one embodiment.

FIG. 1 is a high-level schematic of a computer implemented method 10 for a decision-support application having a requirement for a demand model, and wherein the method for obtaining a demand model first includes: selecting or specifying at 12 the relevant product choice set in such a way as to include all products in the retail category whose product drag and product substitution effects are of interest in the context of the decision-support application. For example, this may include selecting a data set that includes any products that have significant cross-elasticity via product drag and product substitution effects with one or more specific products in the retail category that are the focus of the demand modeling analysis.

One or more retail sales data sets are obtained at 15, for example, by accessing memory storage such as a database, which data sets are used for the performing the relevant demand modeling analysis. In one embodiment, a primary data set comprises of the aggregate retail-sales data provided in the form of a time series of unit-sales and unit-price over multiple stores. In a further aspect, auxiliary data sets are obtained or accessed that include relevant information pertaining to the product and store attributes for the products and stores included in the primary data set; the attributes in the auxiliary data sets may include, for example, features associated with product packaging and product quality, store size, location and neighborhood demographics, promotions and advertising information, and inventory stocking levels, etc.

Although there may be missing data elements in the nonprimary or auxiliary data, the method provides, at 25 in FIG. 1, the specification and imputation of missing values in the primary data set. It should be understood that, in alternate embodiments, the methods can be extended to the consideration of the missing data elements in the auxiliary data set as well. The consideration of the missing data elements (e.g., missing unit-price values) in the primary data set is important, since the self and cross-elasticity effects of the unit-price values are invariably the dominant contribution to the prediction of the unit-sales values via the fitted demand models.

Finally, as shown in FIG. 1, at 30, an iterative procedure is implemented by the programmed processor unit or computing system to obtain converged multinomial-logit demand models along with the corresponding converged complete data sets with the imputed unit-prices and estimated unit-sales for all the missing values in a self-consistent manner i.e., the imputed values for the unit-prices and the estimated values for unit-sales are consistent with predictions of the converged multinomial-logit model obtained as described above; and likewise, the converged multinomial model is consistent with the corresponding model that would be obtained if the missing values in the incomplete data set are replaced with the imputed unit-prices and estimated unit-sales described above respectively.

FIG. 2A schematically illustrates an example primary data set 40 used for the demand modeling which includes the following data: time series of unit-price and unit-sales values for a time duration, e.g., a week or range of weeks, across multiple stores and across multiple products in the retail category. The table 40 shown in FIG. 2A includes data obtained from a primary data source, e.g., sales data, and Table 50 shown in FIG. 2B includes dummy variables for missing data as will be explained in further detail.

In one example embodiment, the table 40 shown in FIG. 2 indicates sales data from the primary data source for each product indicated as having a ProductID value (e.g., a Universal Product Category (UPC)), represented in a column 42, for each time period, e.g., week, as indicated by a weekID value in a column 44, for a specific and unique retail channel, such as a store, an outlet or an account store represented in column 41, and, includes the data records for the unit sales (including unit quantity (products sold) in column 46 and unit price of that product as represented by column 48. That is, each record in table 40 corresponds to a product from the relevant choice set in a given store and in a given time period, e.g., a week; and, table 40 may be indexed by the product identifier column 42 including values such as UPC or like barcode-implemented product identifier used for tracking products in retail stores. It is understood that data from a non-primary or auxiliary data source, in this example, may be additionally stored in a table 40 of FIG. 2 or, stored separately in a separate product attributes table (not shown).

In one embodiment, Table 50 shown in FIG. 2B includes dummy variables for missing data as will be explained in further detail. As shown in FIG. 2B, Examples of "missing" rows in this primary data set are shown schematically, with each such row augmented by dummy variables having values to be populated in columns 55, 57, for example, corresponding to the assignment of a type I or type II root ca use indication in columns 58, 59, respectively, for the missing data elements.

That is, in the example retail environment, the presence of missing data elements for a particular (product, store, time-period) or (p, s, t) combination, can be broadly ascribed to the two distinct sets of "root causes":

1) The first type root cause, (or "type I"), represents the situation when there is an actual zero unit sales for a particular product, store, time-period or (p, s, t) combination, and as a consequence, the entire relevant data record for that (p, s, t) combination is simply omitted from the data reporting. There may be several possible underlying reasons for the zero unit-sales situation, including for example, the delayed introduction or early withdrawal of certain products in certain stores, or the absence of store inventory in certain circumstances due to product stock-outs or due to missed order deliveries.

2) The second type root cause, (or "type II"), represents the situation in which there are actual non-zero unit sales for a particular (p, s, t) combination, but nevertheless, the relevant data record was omitted from the data set, perhaps inadvertently as a consequence of some random malfunction in the data logging, reporting or integration process that was used for compiling the sales data set.

The type I root cause for a missing data record may be identified by examining the patterns for the missing data in the sales data set, or alternatively, by cross-comparing the missing data records with any other relevant auxiliary information on the timing of product introductions and withdrawals, or by cross-comparing the missing data records with other auxiliary information on store inventory levels and product stock-outs which may reveal, for example, the delayed introduction or discontinuation of the product in a particular market or store, the occurrence of out-of-stocks in a given store, or missing product deliveries that affect store replenishment stock levels. Nevertheless, irrespective of the specific underlying condition for the type I root cause of a missing data record, the corresponding missing unit-sales field for that particular (p, s, t) combination is explicitly set to zero to reflect the reality of the underlying situation regarding the unavailability of the product; however, the demand modeling analysis takes into account the fact that this zero unit sales is irrespective of the magnitude of the corresponding unit price of the product.

Identifying the type II root cause for a missing data record in a sales data set is difficult, but one approach is to simply assign the type II root cause to all missing data records for which the type I root cause cannot be unambiguously assigned. As a consequence, the missing data records for the type II root cause will have some non-zero but unknown value for the corresponding unit-sales and unit-price fields, and therefore these data records cannot be used for the demand modeling analysis without imputing the values of these missing fields, either prior to, or as integral part of the demand modeling analysis.

The rationale for requiring the identification of the type I or type II root cause for the missing sales data records is to ensure that the respective missing data elements can be either specified (in the case of the type I root cause), or imputed (in the case of the type II root cause), so that a "complete" data set (that is, a data set with no missing data elements) can be obtained. This process further leads to more efficient use of the remaining non-missing data records for the demand modeling analysis.

Formally, therefore, in order to obtain a complete data set from the initial sales data set with missing records, the respective missing values for the type I root cause are fixed deterministic values as specified, while the missing values for the type II root cause are random values as imputed by probabilistic sampling. With this specification and imputation of the missing data elements, the resulting complete data sets lead to improvements in the accuracy of the parameter estimates of the demand models that are obtained from the sales data set, which become more significant as the fraction of missing data elements in the data set becomes large.

In one aspect shown in FIG. 2B, these type I or type II root causes are indicated as binary values: e.g., a "1" for indicating missing value (Type I or Type II) or otherwise is "0".

FIGS. 3 through 6 depict the sequence of method steps involved in the missing data specification and imputation, and in the demand modeling as employed by a programmed processor in connection with the memory storage (primary data and auxiliary data sets).

Figure 3:
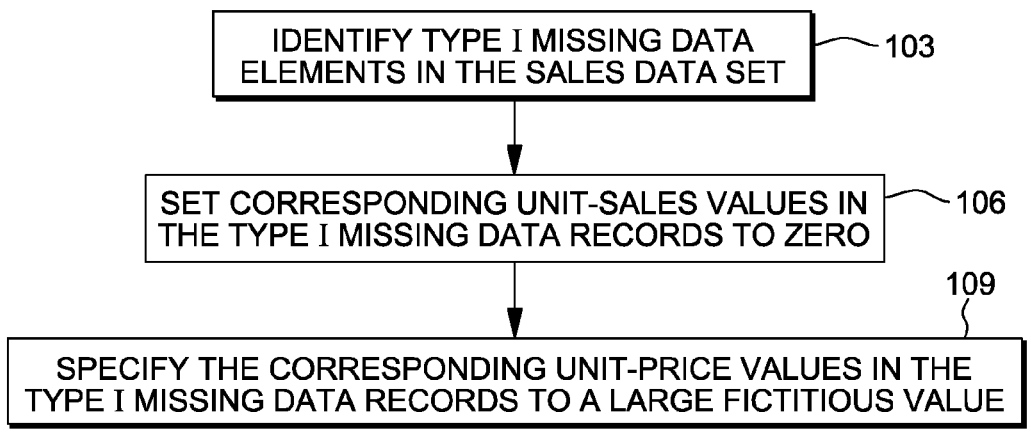
FIG. 3 illustrates the computer-implemented method for the identification and specification of the type I missing data records in the sales data set.

FIG. 3 describes the method 100 for addressing the missing data records with the type I root cause, which includes identifying at 103 the type I root cause, followed at 106 by deterministically specifying the corresponding unit-sales values to be zero, and finally, at 109 deterministically specifying the corresponding unit-price values to be some large fictitious value. In one embodiment, the method for identifying the type I root cause may be performed by cross-comparing with auxiliary data sets containing information on product introduction and withdrawals, or on product inventory and stocking levels. For instance, a product master data file maintained by a relevant consumer products manufacturer will often contain product introduction and withdrawal dates, and the store delivery data can often be analyzed to detect store-level stock-outs which are often recorded directly or for some short shelf-life products can be inferred from the absence of stale returns.

In one embodiment, the method step specifying the corresponding unit-price values to be some large fictitious value ensures that a reasonable regression function can be obtained in which predicted unit-sales values from the demand model will be forced to zero as a consequence of the large value for the corresponding unit price. This large fictitious value can be quite arbitrary as long as it has the desired effect of forcing the predicted unit sales to be zero. In one example, a fictitious value is 100 to 1000 times the maximum unit-price in the category. Some care should be taken to avoid choosing too large a number, say the maximum value of the floating point number representation in the computer system, since this may lead to numerical convergence difficulties in the demand estimation procedure, and therefore will not have the desired effect of forcing the corresponding predicted unit-sales to zero.

From the perspective of the choice of regression variables for the demand modeling, such as the multinomial regression model described herein, this method step is equivalent to, but conceptually far simpler than the method step of retaining the original unit-price values (i.e., rather than replacing them as proposed by large fictitious values), but adding a dummy variable for the type I root cause missing unit-price data element, which would lead to a large fixed offset in the regression function for these cases, and in this way achieve the same effect of forcing the predicted unit-sales values to zero for the type I root cause missing data records.

Figure 4:
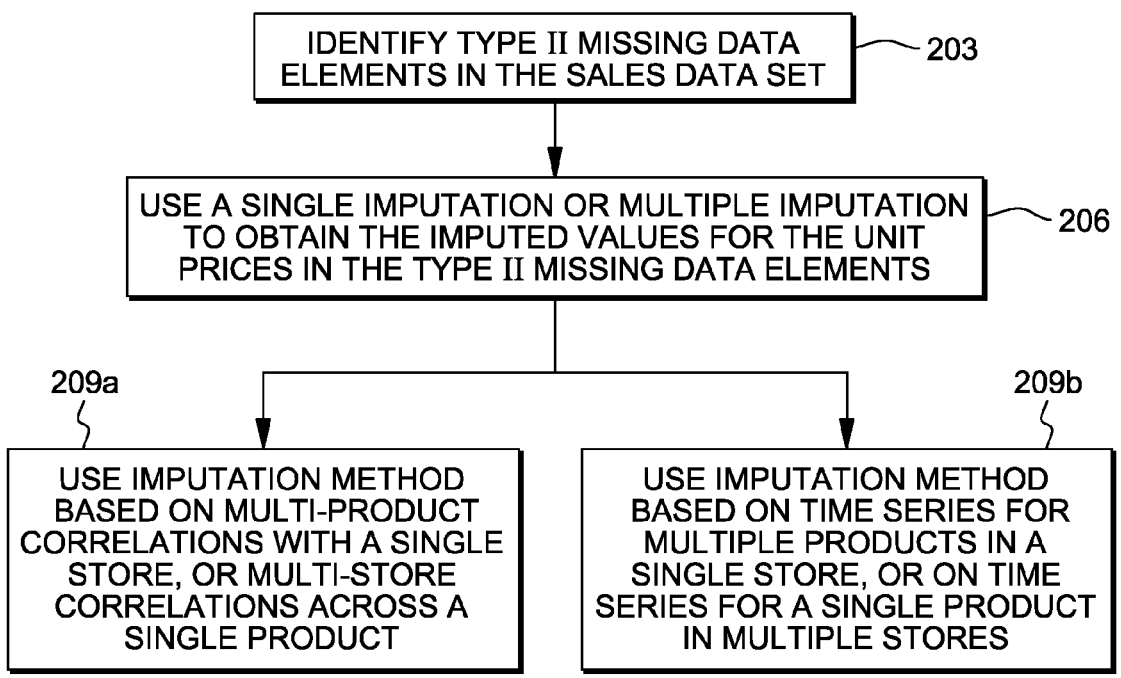
FIG. 4 illustrates computer-implemented method for the identification the type II missing data records, and the imputation and multiple imputation of the unit price fields for the type II missing data records.

FIG. 4 describes the method steps 200 for addressing the missing data records with the type II root cause, which includes identifying at 203 the type II root cause, followed at 206 by imputing the corresponding unit-price values based on various techniques as described in greater detail herein below. For imputation of the unit-price values for each of the missing data elements with a type II root cause, the method for imputing the relevant missing unit-price values uses imputation techniques that take advantage of the correlation structure across multiple cross-sections including the cross-store correlations of the unit prices for the corresponding product, or alternately, imputing the relevant missing unit-price values uses the cross-product correlations of the unit prices for all the products in the choice set in the corresponding store in each time-period. Any auxiliary information pertaining to external market factors (e.g. inflation rates, seasonality etc.) that influence the product pricing in the market geography and the retail category can also be used in the imputation procedure.

That is, one technique at 209a, FIG. 4 involves using an imputation method taking into account multi-product correlations with a single store, or multi-store correlations across a single product or, at 209b, using imputation method based on time series for multiple products in a single store, or on time series for a single product in multiple stores. Technique 209a takes into account multi-product correlations, multi-store correlations in the sales data set, wherein a single complete data set is obtained with the single sample imputation for each type II root cause missing unit-price value or, in the case of multiple imputation, a plurality of complete data sets are obtained by multiple sample imputations for each type II root cause missing unit-price value.

In one example, although the unit-prices for each (s, t) combination are available in a time series form, for imputation or smoothing of the unit-price data at 209b, the time-series auto-correlations are not as important compared to the cross-product correlations within each store, or compared to the cross-store correlations for each product. Therefore, a multi-variate normal model for the missing value imputation incorporating either the cross-product correlations, or incorporating the cross-store correlations is appropriate for the data set, and the transformations of the original sales data that are required to analyze these respective correlations is described in reference to FIGS. 7 and 8.

Figure 5:
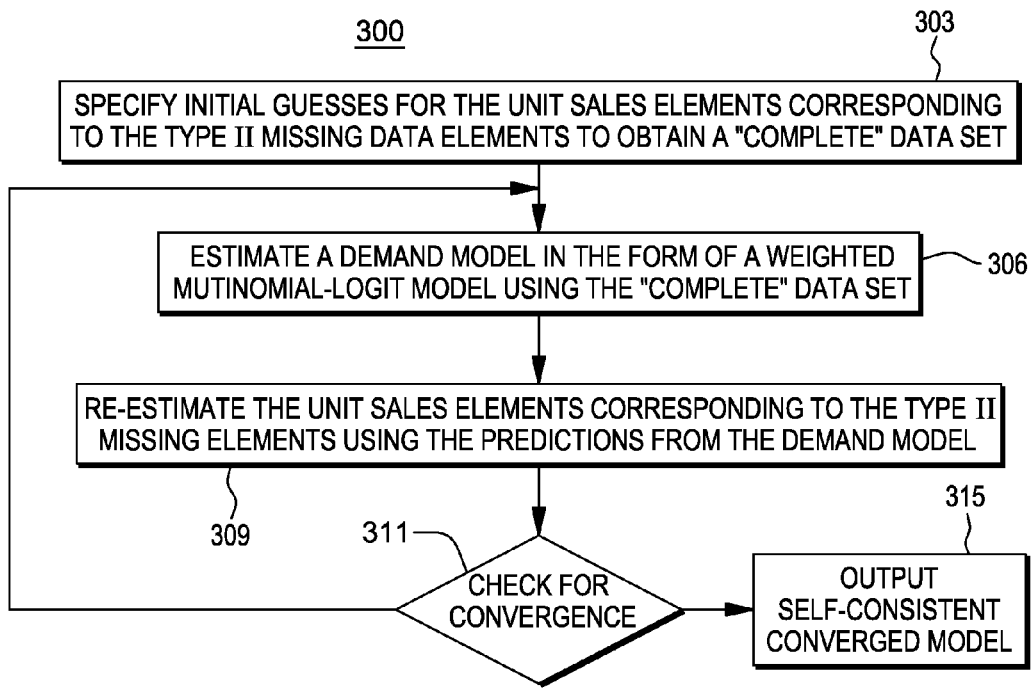
FIG. 5 illustrates the computer-implemented method for the self-consistent estimation of the unit-sales fields for the type II missing data records, and the corresponding multinomial-logit based demand model for the retail category.

FIG. 5 describes the method 300 for the self-consistent estimation of the demand model jointly with the estimates of the type II root cause missing unit-sales values for each complete data set obtained using the methods in FIG. 4. At 303, an initial guess is first specified for these missing unit-sales values in each complete data set, following which, at 306, a demand model is obtained from this complete data set using a weighted multinomial-logit model for the market share of each product in a choice set, as described in detail below. The predictions from this demand model are used to re-estimate, at 309, the initial guesses for the type II root cause missing unit-sales values, leading to a complete data set with updated values for these missing unit-sales values. The alternating method steps of demand modeling at 306 and re-estimation at 309 of the type II root cause missing unit sales elements are repeated until the procedure converges at 311 to yield the final self-consistent demand model for output at 315.

The multinomial-logit model for estimating the demand share of product i with unit-price $p_i$, given the choice set of P products, is given by $$\pi_i(\alpha, \beta) = \frac{\exp(\alpha_i + \beta_i p_i)}{\sum_{k \in P} \exp(\alpha_k + \beta_k p_k)}$$

where the offset term $\alpha_i$ denotes the base-level product preference, and $\beta_i$ denotes the corresponding price sensitivity for product i. Assuming that the unit-price and unit-sales data for different stores and different time-periods are independent and identically distributed, then given a complete data set of such values, the coefficients in this model are estimated using the maximum likelihood method, whose implementation is available in several computer packages. A description of the computation procedure for estimating the multinomial-logit model coefficients and corresponding standard errors using the maximum likelihood method is found, for example, in K. Train, Discrete Choice Methods With Simulation, $2^{nd}$ edition, Cambridge University Press (2009), incorporated by reference.

Given the market share for each product from this model, if the aggregate market size over all the products in this choice set for a given store and time-period is given by M, then the corresponding unit-sales for product i is given by $d_i = \pi_i(\alpha, \beta)$ M. However, since the complete data set used for fitting the multinomial-logic model for the market share includes guesses for the unit-sales values for the type II missing data, these guesses are corrected in a manner described below. For a given store and time-period, a general case is considered wherein there are: P products in the product choice set, but the sales data is missing for some subset of K products, where K<P. This may be regarded as a case of the Expectation Maximization (EM) approach, as described for example in G. J. McLachlan and T. Krishnan, "The EM Algorithm and Extensions", Wiley Series in Probability and Statistics, 1997, incorporated by reference herein, wherein to estimate the missing data, the initial guesses of the missing unit-sales values are assumed, which are used to compute the resulting demand share using the multinomial-logit model described above, which in turn is used to provide corrections to the assumed initial guesses. In the i'th iteration of the EM algorithm, the predicted unit sales data satisfy the following equations. That is, a succession of steps can be regarded as the iterations of the EM algorithm, and in this way, in the i'th iteration, the predicted unit-sales data satisfy the following equations $$n_1^{(i)} = \pi_1^{(i-1)}(n_1^{(i)} + n_2^{(i)} + \ldots + n_P^{(i)})$$

$$n_2^{(i)} = \pi_2^{(i)}(n_1^{(i)} + n_2^{(i)} + \ldots + n_P^{(i)})$$

$$\ldots$$

$$n_P^{(i)} = \pi_P^{(i-1)}(n_1^{(i)} + n_2^{(i)} + \ldots + n_P^{(i)})$$

where $\pi_j^{(i-1)}$, $j=1, \ldots, P$ denotes the demand share estimates from iteration i−1 for each store and time-period combination with missing unit-sales elements, are the estimated unit sales for each product in iteration i. Solving the above equations, the required updated estimate for the missing unit sales values are obtained as $$n_j^{(i)} = \frac{\pi_j^{(i-1)} \mu}{\left(1 - \sum_{i \in K} \pi_i^{(i-1)}\right)}, \text{ for } j \in K$$

where $\mu$ is the sum of unit sales for non-missing elements corresponding the same store and time-period.

These method steps corresponding to individual iterations of the EM approach, as described above, can be repeated until the unit-sales value for missing elements along with the corresponding demand model based on these values converge to their final self-consistent values. Furthermore, the extensions of these method steps for multinomial-logit models that use semi-parametric and non-parametric regression functions, such as neural networks and multi-layer perceptrons which are described for example in H. Hruschka, "Relevance of Functional Flexibility for Heterogeneous Sales Response Models—A Comparison of Parametric and Semi-parametric Methods", European Journal of Operational Research, 2006, could be used.

Figure 6:
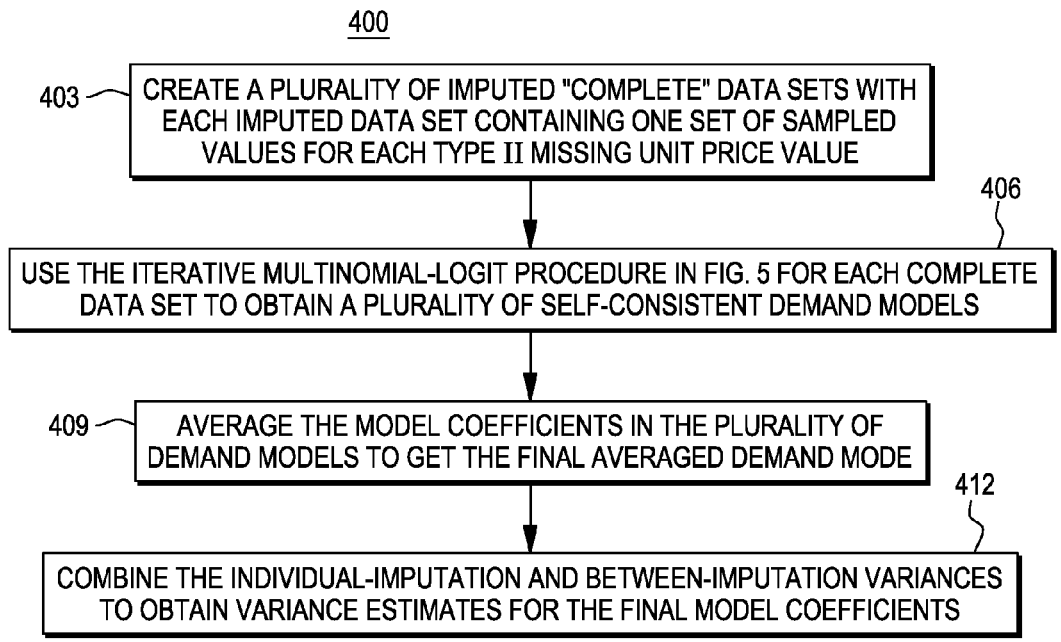
FIG. 6 illustrates computer-implemented method for the multiple imputation case, along with the estimation of the parameters and standard errors of the final averaged demand model.

FIG. 6 describes the method 400 for the multiple imputation case wherein the method steps 300 of FIG. 5 are individually performed on each complete data set in the plurality of complete data sets to obtain at 406 a plurality of corresponding demand models. At 409, the coefficients of this plurality of demand models are averaged to obtain the final demand model. Similarly, the within-imputation variance estimates for the coefficients provided along with the coefficients estimates themselves by many computer programs for implementing demand models, and the between-imputation variance estimates for the coefficients of the plurality of demand models that can also be computed while averaging the coefficients of this plurality of demand models as described at 409, can be combined at 412 to obtain the variance estimates of the coefficients of the final demand model as described below. The procedure for obtaining the variance estimates for the parameters of statistical models from multiple imputation data sets can be found, for example, in a reference by, J. L. Schafer entitled "The Multiple Imputation FAQ page", http://www.stat.psu.edu/~jls/mifaq.html.

FIGS. 7 through 8 show the data layout involved in the missing data imputation for the unit-price data, which can be carried out with widely-available packages for single imputation and multiple imputation, respectively taking into account cross-product correlations, or cross-store correlations in the unit prices. In either case, a multivariate normal model is assumed for the variable dependencies, and the variables are log-transformed to ensure that the imputed estimates are positive-valued.

FIG. 7 schematically illustrates the restructured data layout 500 for the single imputation or multiple imputation of the unit-price fields for type II missing data records using the cross-product correlations of the unit price for a specific store. The required data restructuring uses standard pivot-table operations, and the missing value imputations based on the correlation structure use a variety of suitable packages for this purpose; both these steps are performed in a statistical programming environments including "Statistical Package for the Social Sciences" (SPSS), "Statistical Analysis System" (SAS) and R (a language and environment for statistical computing and graphics, see http://www.r-project.org/). As shown in FIG. 7, for particular products represented by respective universal product code (UPC) 501, the data layout 500 includes the relevant time period, e.g., week 503, and, the product price at the various entities, i.e., retail stores, such as price_store1 506, . . . , price_store4 509.

FIG. 8 schematically illustrates the restructured data layout 600 for the single imputation or multiple imputation of the unit-price fields for type II missing data elements using cross-store correlations of the unit price for a specific product. The required data restructuring uses standard pivot-table operations, and the missing value imputations based on the correlation structure use a variety of suitable packages for this purpose; both these steps can be conveniently performed in the aforesaid statistical programming environments including SPSS, SAS and R. As shown in FIG. 8, for particular entities, e.g., retail stores, indicated by a respective StoreID 601, the data layout 600 includes the associated relevant time period, e.g., week 603, and, the product price at the various identified entities, i.e., retail stores, such as price_store1 605, . . . , price_store5 609.

In one non-limiting, illustrative embodiment, a demand model is generated using a sales data set with missing data elements for a retail category corresponding to a household staple grocery with products having a retail shelf life of about a week. The description of the "real-world" sales data set used in this example embodiment is "generic" and in particular, the details regarding the products or product category in the demand modeling have been omitted for clarity in the exposition. The unit-sales and unit-price data for the product category is provided as a computer file (e.g., a database record) which contains weekly-aggregated sales data on 333 products with unique UPC codes in the category, wherein UPC stands for Universal Product Category, which is a barcode-implemented product identifier that is commonly used for tracking products in retail stores, and this sales data is collected from 146 stores whose TDLinx codes were within the same metropolitan market geography, over a 3 year period from 2006 to 2009, wherein TDLinx is a location-based code, which developed by Nielsen (http://en-us.nielsen.com) to specify a unique retail channel, such as an individual store, retail outlet or retail sales account. Each record in this data set, therefore, contains separate fields with the UPC code, TDLinx code, Week index, unit-sales and unit-price information, for each (product, store, and week) or (p, s, t) combination for which the aggregated sales data is reported. The missing data elements for a particular (p, s, t) combination may be due to a type I or type II root cause. Even in the absence of corroborating data on product introductions and withdrawals it can be ascertained from the pattern of missing values in the data set, and with greatest certainty in the case of products with significant sales volumes, as to which of the missing values had a type I root cause, since these invariably included a sequence of missing values either at the beginning or the end of the time-series sequence for a given (p, s) combination.

In addition to the sales data set for the product category, some partial auxiliary data was also available relating to: store promotions, inventory stock-outs and coupon redemptions, and this auxiliary data can be joined to the sales data, to support various extensions of the analysis that incorporate these auxiliary data elements. Furthermore, additional detailed information on the various individual attributes for the products in the sales data set can be obtained from a product master-data file, which contains information such as brand, packaging and product type. Finally, in an illustrative embodiment where the product category in the illustrative example corresponds to a "processed-food" category, additional data on the health-benefits, nutritional composition and product quality may also be ascertained from the product label information in public-domain databases, and used as auxiliary elements in the demand modeling analysis.

Figure 9:
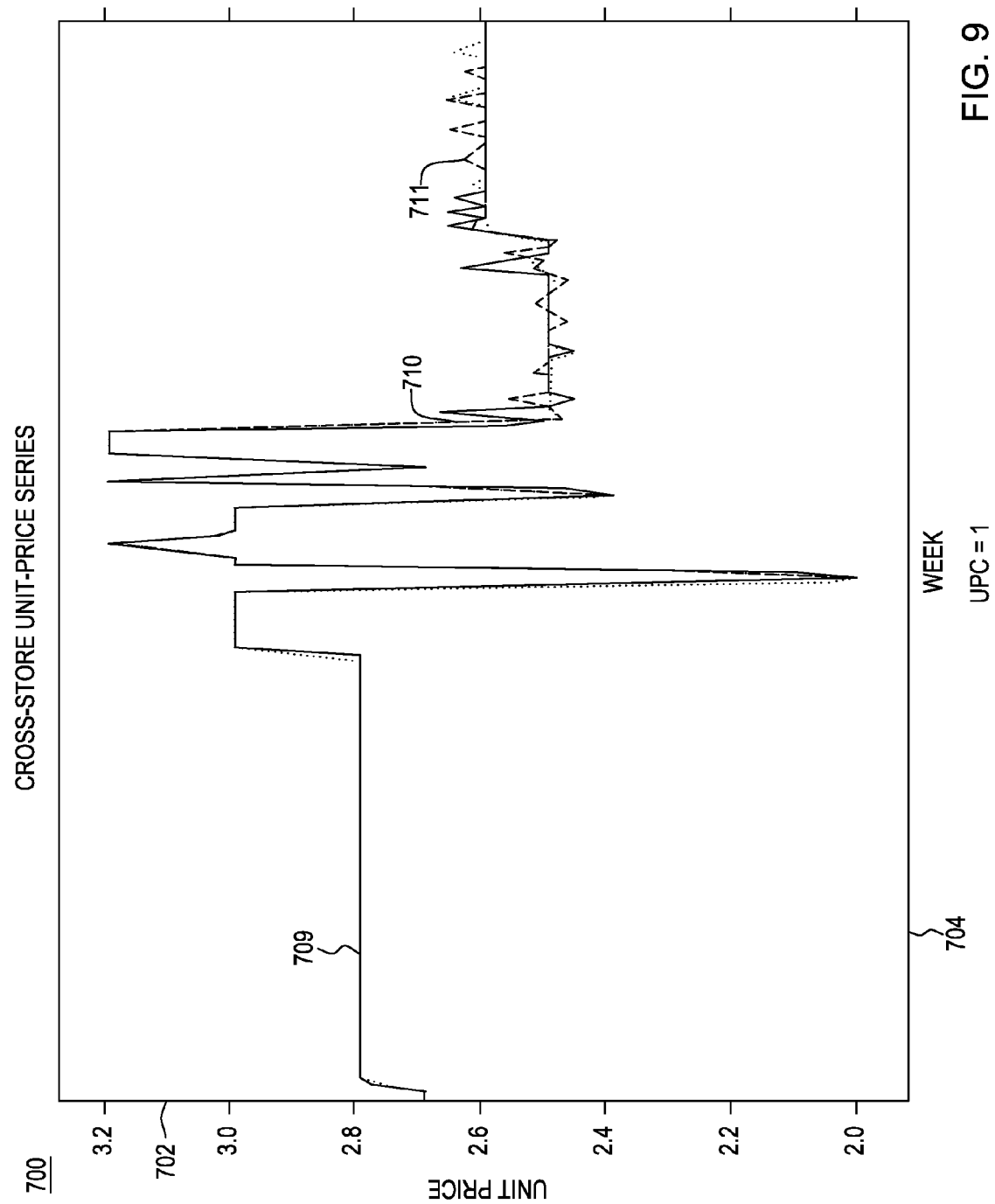
FIG. 9 illustrates the time sequence of unit-price values for a specific product across 3 different stores, from a sales data set used in a particular embodiment of the invention.

FIG. 9 illustrates a plot 700 of unit price values for a product shown on y-axis 702 collected and shown plotted over time shown on the x-axis 704. The plot 700 shows the time series sequence of unit-price values in this data set for one of the products using separate lines 709, 710, 711 shown for each of respective three different stores. The prices in the three stores track each other quite closely, which is not surprising since the stores in the data set belong to the same retail chain, with the small differences in price due to the differentiated markup policy used by the individual stores above the retail chain-negotiated delivery price. For this data set, these strong cross-store correlations are used to impute any missing unit-price data elements.

Figure 10:
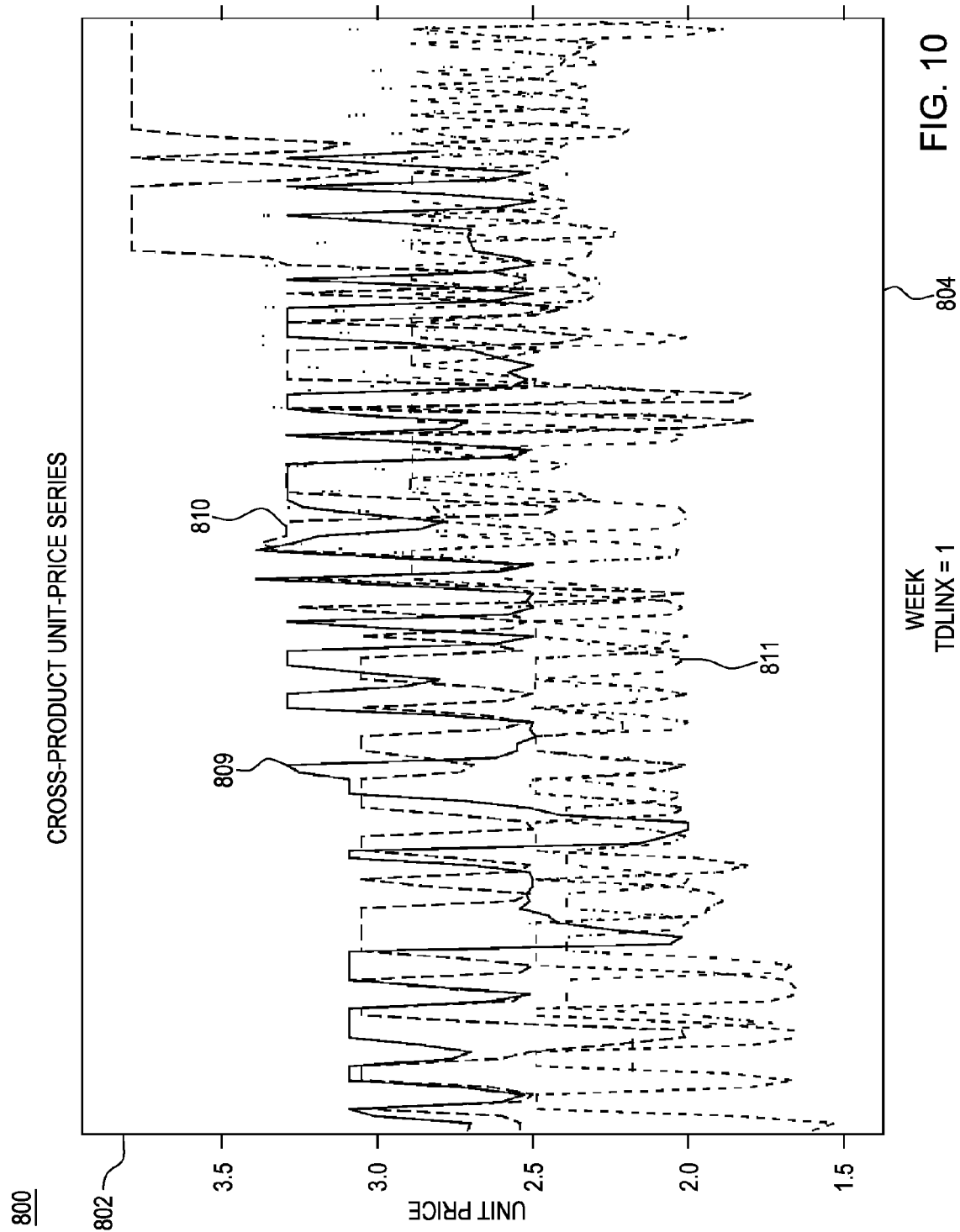
FIG. 10 illustrates the time sequence of unit-price values across 3 different for a specific store, from a sales data set used in a particular embodiment of the invention; and, FIG. 11 illustrates an exemplary hardware configuration to run method steps described in FIGS. 1, 3-6 in one embodiment.

FIG. 10 illustrates a plot 800 of unit price values for a product shown on y-axis 802 collected and shown plotted over time shown on the x-axis 804. The plot 800 shows the time series sequence of unit-price values in this data set for a given store with different respective lines 809, 810, 811 shown for the three different products sold in this store. As can be seen, the sequence of unit-price values oscillate between the "regular price" and the "promotion price" and the correlations between pricing patterns of two or more products (perhaps due to intra-brand promotion calendars, or due to a common seasonality-mediated promotion strategy across all brands in the retail category) can also be used to impute any missing unit-price elements. This is particularly useful when multiple store data is either not available, or when available consists of disparate stores with very different product pricing characteristics and markup policies.

The system and method described herein for demand modeling in retail categories, is an important requirement for a variety of decision-support applications that are widely used by various entities in the retail supply chain such as consumer product manufacturers, consumer retail chains, and individual retail stores. Some examples of decision-support applications that require demand modeling in retail categories include, but are not limited to, product demand forecasting, inventory optimization, strategic product pricing, product-line rationalization, and promotion planning.

A particular embodiment of this invention is described in which a sales data set with missing values for the time series for weekly sales data for a set of competing products in a certain retail foods category in the stores of a large grocery retail chain is used to obtain a suitable demand model using the method steps of the present invention, with significant improvements over the methods in the prior art.

Figure 11:
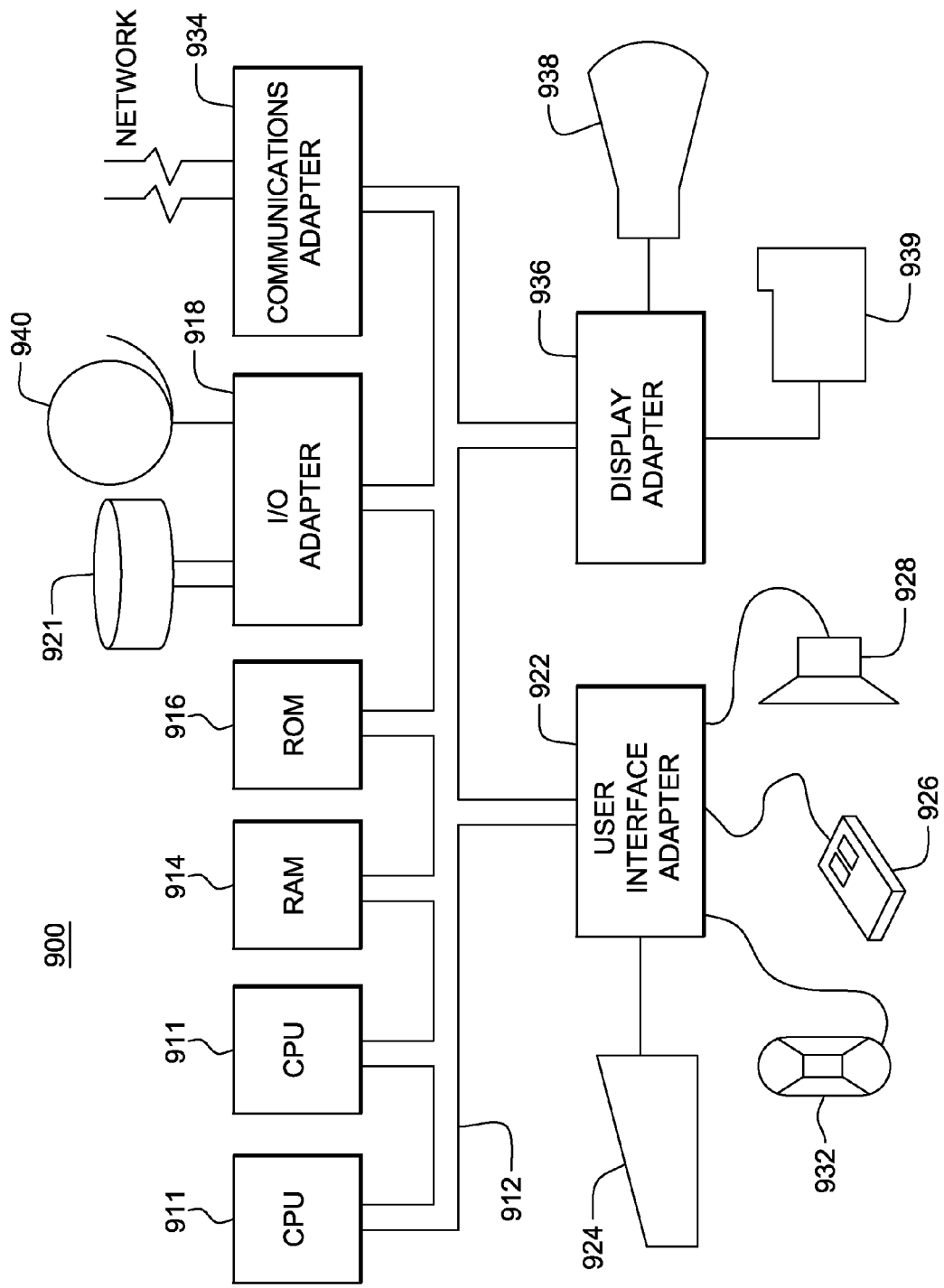

FIG. 11 illustrates an exemplary hardware configuration of the computing system 900. The hardware configuration preferably has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting the system 900 to a data processing network, the Internet, an Intranet, a local area network (LAN), etc., and a display adapter 936 for connecting the bus 912 to a display device 938 and/or printer 939 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A computer-implemented method for accurate demand modeling in a retail category, the method comprising:
    selecting a product set for a demand modeling analysis in a chosen retail category;
    obtaining a retail-level sales data set for the product set in the chosen retail category having data elements representing a time series of unit-prices and unit-sales for the plurality of products "p" in a chosen retail category taken over a plurality of time periods "t", and over a plurality of retail chains and stores "s", said sales data set having a combination of data elements (p, s, t);
    identifying any missing data element corresponding to a specific (p, s, t) combination in the retail sales data set and determining a root cause type for each said missing data element, a corresponding root cause type for said missing data element comprising: a first type root cause for a missing data element due to a unit-sales being zero, or a second type root cause for the missing data element that does not have a first type root cause, but for which the corresponding data element would have had a non-zero unit-sales value that is omitted from the sales data set;
    encoding dummy variables for the missing data elements in the retail sales data set, wherein for any missing elements corresponding to specific (p, s, t) combinations in the data set, said dummy variable value encoding performed according to the corresponding root cause for the said missing data element; and,
    generating a demand model for the products in the retail category from the sales data set containing the missing data elements corresponding to the root causes for certain product, store and time-period combinations,
    wherein a computing system including at least one processor and at least one memory device connected to the processor performs the selecting, obtaining, identifying, encoding and the generating.

2. The computer-implemented method according to claim 1, further comprising: augmenting the sales data set in the chosen retail category with auxiliary data comprising: individual product attributes, individual store attributes and other econometric factors that influence customer demand in the retail category.

3. The computer-implemented method according to claim 2, wherein said identifying any missing data elements corresponding to a specific (p, s, t) combination comprises one or more of: examining patterns in the retail sales data, and, performing a cross-comparison with any relevant auxiliary data to identify the root cause for the missing data elements.

4. The computer-implemented method according to claim 1, wherein said encoding dummy variables for the missing data elements corresponding to the first type root cause comprises:
    specifying the unit-sales values for a first type root cause and setting the unit-sales values to zero for the relevant missing data elements for the product, store, time-period combination; and
    specifying the unit-price values for a first type root cause and setting the unit-price values to a fictitious value significantly greater than the actual unit price for the corresponding product, store and time-period combination, and greater than the actual unit prices for any of the other products in the selected product set for the same store, time-period combination.

5. The computer-implemented method according to claim 4, wherein the encoding dummy variables for the missing data elements corresponding to the second type root cause further comprises:
    imputing the unit-price values for the missing data elements for each combination of (p, s, t) with the second type root cause, and replacing each missing unit-price value by a single imputed value, said method further comprising:
    initializing the missing unit-sales values corresponding to the imputed unit-price values by an initial estimate value, thereby obtaining a single complete data set for said demand modeling.

6. The computer-implemented method according to claim 5, wherein, for a case of multiple imputation, the imputing the unit-price values for the missing data elements for each combination of (p, s, t) with the second type root cause, includes:
    replacing each missing unit-price value by a plurality of imputed price values;
    initializing any missing unit-sales values corresponding to the plurality of imputed unit-price values by an initial estimate value, thereby obtaining a plurality of complete data sets for said demand modeling.

7. The computer-implemented method according to claim 6, further comprising:
estimating parameters of a demand response model associated with a respective single complete data set or a respective complete set of said plurality of complete data sets.

8. The computer-implemented method according to claim 7, further comprising:
for each demand model, starting from the initial estimate value for the second type root cause missing unit-sales values, using an iterative-convergent procedure based on an Expectation Maximization (EM) approach to obtain probability estimates for product demand using a multinomial logit demand modeling procedure;
using said probability estimates to replace the missing values in the data by their expectation under this computed probability;
revising estimates of the unit-sales values for said second type root cause missing data elements based on predictions obtained from the multinomial-logit demand modeling procedure;
replacing, at each iteration, existing estimate values for the second type root cause missing unit-sales values with a revised estimate values using predictions obtained via the multinomial-logit demand modeling procedure; and,
repeating said multinomial-logit demand modeling procedure and said revised estimation of missing values from demand model predictions until a sequence of demand models from these iterations converges to a final demand model within a predetermined numerical tolerance.

9. The computer-implemented method according to claim 8, further comprising:
repeating said modeling and predicting until a sequence of data sets with the missing unit-sales values re-estimated converges to a final value within a predetermined tolerance, whereby one or more single self-consistent converged demand model and one or more corresponding converged imputed data sets is obtained.

10. The computer-implemented method according to claim 8, wherein for the case of multiple imputation, combining the plurality of demand models obtained to generate a final averaged demand model with estimated values for the model coefficients, and for the standard errors of the model coefficients.

11. The computer-implemented method according to claim 8, wherein said iterative-convergent procedure includes using said Expectation-Maximization (EM) based approach which incorporates the estimation of the demand response model, including self-consistent estimates of the missing unit-sales values in the complete data set.

12. A computer program product for demand modeling in a retail category, the computer program product comprising a tangible storage medium readable by a processing circuit and storing instructions run by the processing circuit for performing a method to: select a product set for a demand modeling analysis in a chosen retail category; obtain a retail-level sales data set for the product set in the chosen retail category having data elements representing a time series of unit-prices and unit-sales for the plurality of products "p" in a chosen retail category taken over a plurality of time periods "t", and over a plurality of retail chains and stores "s", said sales data set having a combination of data elements (p, s, t); identify any missing data element corresponding to a specific (p, s, t) combination in the retail sales data set and determining a root cause type for each said missing data element, a corresponding root cause type for said missing data element comprising: a first type root cause for a missing data element due to a unit-sales being zero, or a second type root cause for the missing data element that does not have a first type root cause, but for which the corresponding data element would have had a non-zero unit-sales value that is omitted from the sales data set; encode dummy variables for the missing data elements in the retail sales data set, wherein for any missing elements corresponding to specific (p, s, t) combinations in the data set, said dummy variable value encoding performed according to the corresponding root cause for the said missing data element; and, generate a demand model for the products in the retail category from the sales data set containing the missing data elements corresponding to the root causes for certain product, store and time-period combinations.

13. The computer program product according to claim 12, wherein the method further: augments the sales data set in the chosen retail category with auxiliary data comprising:
individual product attributes, individual store attributes and other econometric factors that influence customer demand in the retail category.

14. The computer program product according to claim 13, wherein said encoding dummy variables for the missing data elements corresponding to the first type root cause comprises:
specifying the unit-sales values for a first type root cause and setting the unit-sales values to zero for the relevant missing data elements for the product, store, time-period combination; and
specifying the unit-price values for a first type root cause and setting the unit-price values to a fictitious value significantly greater than the actual unit price for the corresponding product, store and time-period combination, and greater than the actual unit prices for any of the other products in the selected product set for the same store, time-period combination.

15. The computer program product according to claim 14, wherein the encoding dummy variables for the missing data elements corresponding to the second type root cause further comprises:
imputing the unit-price values for the missing data elements for each combination of (p, s, t) with the second type root cause, and replacing each missing unit-price value by a single imputed value, said method further comprising:
initializing the missing unit-sales values corresponding to the imputed unit-price values by an initial estimate value, thereby obtaining a single complete data set for said demand modeling.

16. The computer program product according to claim 15, wherein, for a case of multiple imputation, the imputing the unit-price values for the missing data elements for each combination of (p, s, t) with the second type root cause, includes:
replacing each missing unit-price value by a plurality of imputed price values;
initializing any missing unit-sales values corresponding to the plurality of imputed unit-price values by an initial estimate value, thereby obtaining a plurality of complete data sets for said demand modeling; and,
estimating parameters of a demand response model associated with a respective single complete data set or a respective complete set of said plurality of complete data sets.

17. The computer program product according to claim 16, further comprising:
for each demand model, starting from the initial estimate value for the second type root cause missing unit-sales values, using an iterative-convergent procedure based on an Expectation Maximization (EM) approach to obtain probability estimates for product demand using a multinomial logit demand modeling procedure;

using said probability estimates to replace the missing values in the data by their expectation under this computed probability;

revising estimates of the unit-sales values for said second type root cause missing data elements based on predictions obtained from the multinomial-logit demand modeling procedure;

replacing, at each iteration, existing estimate values for the second type root cause missing unit-sales values with a revised estimate values using predictions obtained via the multinomial-logit demand modeling procedure; and, repeating said multinomial-logit demand modeling procedure and said revised estimation of missing values from demand model predictions until a sequence of demand models from these iterations converges to a final demand model within a predetermined numerical tolerance.

18. The computer program product according to claim 17, further comprising:

repeating said modeling and predicting until a sequence of data sets with the missing unit-sales values re-estimated converges to a final value within a predetermined tolerance, whereby one or more single self-consistent converged demand model and one or more corresponding converged imputed data sets is obtained.

19. The computer-implemented method according to claim 17, wherein for the case of multiple imputation, combining the plurality of demand models obtained to generate a final averaged demand model with estimated values for the model coefficients, and for the standard errors of the model coefficients.

20. The computer-implemented method according to claim 17, wherein said iterative-convergent procedure includes using an Expectation-Maximization (EM) based approach which incorporates the estimation of the demand response model, including self-consistent estimates of the missing unit-sales values in the complete data set.

21. A system for accurate demand modeling in a retail category comprising:

at least one processor; and
at least one memory device connected to the processor, wherein the processor is programmed to:

select a product set for a demand modeling analysis in a chosen retail category;

obtain a retail-level sales data set for the product set in the chosen retail category having data elements representing a time series of unit-prices and unit-sales for the plurality of products "p" in a chosen retail category taken over a plurality of time periods "t", and over a plurality of retail chains and stores "s", said sales data set having a combination of data elements (p, s, t);

identify any missing data element corresponding to a specific (p, s, t) combination in the retail sales data set and determining a root cause type for each said missing data element;

encode dummy variables for the missing data elements in the retail sales data set, wherein for any missing elements corresponding to specific (p, s, t) combinations in the data set, said dummy variable value encoding performed according to the corresponding root cause for the said missing data element, a corresponding root cause type for said missing data element comprising:

a first type root cause for a missing data element due to a unit-sales being zero, or a second type root cause for the missing data element that does not have a first type root cause, but for which the corresponding data element would have had a non-zero unit-sales value that is omitted from the sales data set; and, generate a demand model for the products in the retail category from the sales data set containing the missing data elements corresponding to the root causes for certain product, store and time-period combinations.

22. The system according to claim 21, wherein said encoding dummy variables for the missing data elements corresponding to the first type root cause comprises:

specifying the unit-sales values for a first type root cause and setting the unit-sales values to zero for the relevant missing data elements for the product, store, time-period combination; and specifying the unit-price values for a first type root cause and setting the unit-price values to a fictitious value significantly greater than the actual unit price for the corresponding product, store and time-period combination, and greater than the actual unit prices for any of the other products in the selected product set for the same store, time-period combination.

* * * * *